United States Patent
Miyata

(10) Patent No.: US 8,608,200 B2
(45) Date of Patent: Dec. 17, 2013

(54) PASSENGER SEAT AIR BAG, PASSENGER SEAT AIR BAG APPARATUS AND VEHICLE

(71) Applicant: Yasuhito Miyata, Tokyo (JP)

(72) Inventor: Yasuhito Miyata, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/713,699

(22) Filed: Dec. 13, 2012

(65) Prior Publication Data

US 2013/0154244 A1 Jun. 20, 2013

(30) Foreign Application Priority Data

Dec. 15, 2011 (JP) ................................. 2011-274691

(51) Int. Cl.
 *B60R 21/20* (2011.01)
 *B60R 21/205* (2011.01)
(52) U.S. Cl.
 USPC ........ 280/743.1; 280/742; 280/752; 493/405; 493/421; 53/429
(58) Field of Classification Search
 USPC ........... 280/828.1, 728.2, 729, 733, 739, 742, 280/743.1, 743.2, 752; 493/405, 421; 53/429
 See application file for complete search history.

(56) References Cited

U.S. PATENT DOCUMENTS

| | | | | |
|---|---|---|---|---|
| 5,492,367 A | * | 2/1996 | Albright et al. | 280/743.1 |
| 5,823,567 A | * | 10/1998 | Behr et al. | 280/743.1 |
| 6,196,585 B1 | * | 3/2001 | Igawa | 280/743.1 |
| 6,739,622 B2 | * | 5/2004 | Halford et al. | 280/743.1 |
| 7,370,880 B2 | * | 5/2008 | Hasebe | 280/729 |
| 7,571,933 B2 | * | 8/2009 | Thomas | 280/743.1 |
| 7,614,655 B2 | * | 11/2009 | Hasebe | 280/743.1 |
| 7,703,802 B2 | | 4/2010 | Suzuki | |
| 7,770,922 B2 | * | 8/2010 | Schneider et al. | 280/739 |
| 2004/0251669 A1 | * | 12/2004 | Fischer et al. | 280/743.1 |
| 2006/0119088 A1 | | 6/2006 | Suzuki | |
| 2007/0018438 A1 | * | 1/2007 | Hasebe et al. | 280/729 |
| 2007/0040367 A1 | * | 2/2007 | Hasebe et al. | 280/743.1 |
| 2011/0088356 A1 | * | 4/2011 | Lachat et al. | 53/429 |
| 2012/0126515 A1 | * | 5/2012 | Miyata | 280/730.1 |

FOREIGN PATENT DOCUMENTS

| | | |
|---|---|---|
| EP | 0 933 266 A2 | 8/1999 |
| JP | 10-071904 | 3/1998 |
| JP | 11-198750 | 7/1999 |
| JP | 2005-096560 | 4/2005 |
| JP | 2008-221979 | 9/2008 |
| JP | 2009-040360 | 2/2009 |
| JP | 446831 | 1/2010 |

* cited by examiner

*Primary Examiner* — Joseph Rocca
*Assistant Examiner* — Darlene P Condra
(74) *Attorney, Agent, or Firm* — Foley & Lardner LLP

(57) ABSTRACT

When an air bag body beings to expand due to gas flowing from an inflator into the air bag body, a left side folded piece and a right side folded piece which have been folded into concertinas expand quickly to thrust laterally to the left and right. Vent holes are located to be exposed in upper faces of the folded pieces. Accordingly, the gas can flow out from the interiors of the folded pieces through the vent holes as soon as the folded pieces begin to expand.

10 Claims, 22 Drawing Sheets

FIG.5A
FIG.5B
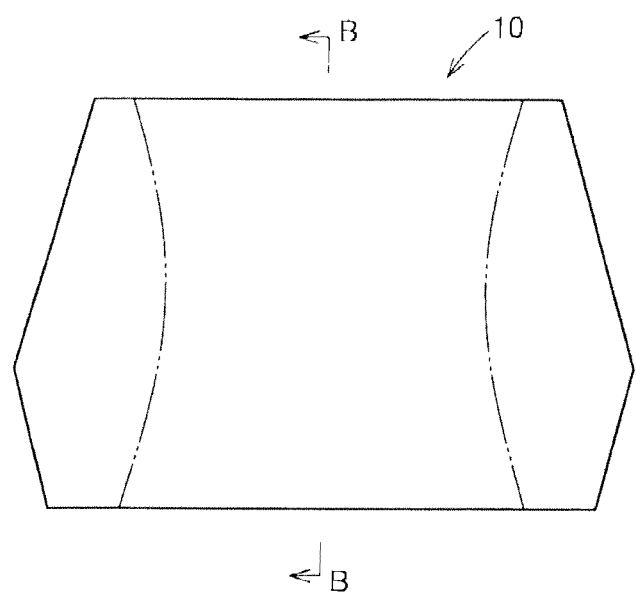
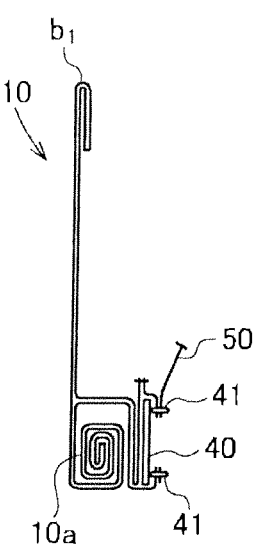

PASSENGER SEAT AIR BAG, PASSENGER SEAT AIR BAG APPARATUS AND VEHICLE

CROSS-REFERENCE TO RELATED APPLICATION

This application is based on and claims priority under 35 USC 119 from Japanese Patent Application No. 2011-274691 filed on Dec. 15, 2011.

BACKGROUND

1. Technical Field

The present invention relates to a passenger seat air bag which is installed in an instrument panel in front of a passenger seat of a vehicle. Particularly, it relates to a passenger seat air bag in which the bottom side of an air bag body is rolled, next the top side of the air bag body is rolled, and then the left side and the right side of the air bag body are folded. In addition, the invention relates to a passenger seat air bag apparatus provided with the passenger seat air bag, and a vehicle provided with the passenger seat air bag apparatus.

2. Related Art

A passenger seat air bag has been disclosed in Patent Literature 1. In the passenger seat air bag, the bottom side of an air bag body is rolled to form a bottom side folded piece. Next, the top side of the air bag body is rolled and put on the bottom side folded piece so as to form a laminated piece. Then, the left side and the right side of the laminated piece are rolled to form a left side folded piece and a right side folded piece respectively so that a space is formed between the left side folded piece and the right side folded piece.

The top side represents a part composing the upper side of the air bag when the air bag is completely inflated, and the bottom side represents a part composing the lower side of the air bag when the air bag is completely inflated. On the other hand, the left and right represent the left and right of a passenger on a passenger seat.

In this Patent Literature 1, as shown in FIG. 1, vent holes are provided in the middle in an up-down direction and on the leftmost side and the rightmost side. Thus, the vent holes are involved in the left side folded piece and the right side folded piece.

A passenger seat air bag which is configured so that a diffuser is placed in an air bag body so as to regulate the flow of gas from an inflator has been disclosed in each of Patent Literatures 2 and 3. In Patent Literature 2, the direction of the flow of gas from the inflator is regulated in the left-right direction by the diffuser. In Patent Literature 3, gas outlets provided in the diffuser (referred to as inner bag in Patent Literature 3) are displaced in the up-down direction or the left-right direction from the direction right behind the vehicle so as to inflate the air bag softly for a passenger on the passenger seat or a child in front thereof.

CITATION LIST

Patent Literature

[Patent Literature 1] JP-A-2009-40360
[Patent Literature 2] JP-A-11-198750
[Patent Literature 3] JP-A-10-071904

SUMMARY OF THE INVENTION

The invention relates to a passenger seat air bag. The passenger seat air bag includes an air bag body that is folded up and that is provided with vent holes in opposite side faces thereof and an inflator opening on a base end side thereof. A bottom side is to be a lower side when the air bag body is completely inflated is rolled so as to be formed as a bottom side folded piece. A top side is to be an upper side when the air bag body is completely inflated is rolled so as to be formed as a top side folded piece. The top side folded piece is put on a passenger side of the bottom side folded piece so as to be formed as a laminated piece of the bottom side folded piece and the top side folded piece. A left side and a right side of the laminated pieces which are to be a left side and a right side of a passenger respectively are folded into concertinas so as to be formed as a left side folded piece and a right side folded piece. The left side folded piece and the right side folded piece are disposed on a left-right-direction center portion of the laminated piece so as to make a space between the left side folded piece and the right side folded piece. The vent holes are located in outward faces of the left side folded piece and the right side folded piece respectively.

BRIEF DESCRIPTION OF THE DRAWINGS

FIGS. 2A, 2B and 2C are views for explaining a method of folding the passenger seat air bag, in which FIG. 2A is a plan view, FIG. 2B is a sectional view taken on line B-B in FIG. 2A and FIG. 2C is an arrow view taken on line C-C in FIG. 2B.

FIGS. 3A and 3B are views for explaining the method of folding the passenger seat air bag, in which FIG. 3A is a plan view, and FIG. 3B is a sectional view taken on line B-B in FIG. 3A.

FIGS. 4A and 4B are views for explaining the method of folding the passenger seat air bag, in which FIG. 4A is a plan view, and FIG. 4B is a sectional view taken on line B-B in FIG. 4A.

FIGS. 5A and 5B are views for explaining the method of folding the passenger seat air bag, in which FIG. 5A is a plan view, and FIG. 5B is a sectional view taken on line B-B in FIG. 5A.

FIGS. 6A and 6B are views for explaining the method of folding the passenger seat air bag, in which FIG. 6A is a plan view, and FIG. 6B is a sectional view taken on line B-B in FIG. 6A.

FIGS. 7A, 7B and 7C are views for explaining the method of folding the passenger seat air bag, in which FIG. 7A is a plan view, FIG. 7B is a sectional view taken on line B-B in FIG. 7A and FIG. 7C is an arrow view taken on line C-C in FIG. 7A.

FIGS. 8A and 8B are views for explaining the method of folding the passenger seat air bag, in which FIG. 8A is a plan view, and FIG. 8B is an arrow view taken on line B-B in FIG. 8A.

FIGS. 9A and 9B are views for explaining the method of folding the passenger seat air bag, in which FIG. 9A is a plan view, and FIG. 9B is an arrow view taken on line B-B in FIG. 9A.

FIGS. 10A and 10B are views for explaining the method of folding the passenger seat air bag, in which FIG. 10A is a plan view, and FIG. 10B is an arrow view taken on line B-B in FIG. 10A.

FIGS. 11A, 11B and 11C are views for explaining the method of folding the passenger seat air bag, in which FIG. 11A is a plan view, FIG. 11B is a sectional view taken on line B-B in FIG. 11A, and FIG. 11C is an arrow view taken on line C-C in FIG. 11A.

FIGS. 12A and 12B are views for explaining the method of folding the passenger seat air bag, in which FIG. 12A is a plan view, and FIG. 12B is a sectional view taken on line B-B in FIG. 12A.

FIGS. 15A and 15B are views for explaining the inflation condition of the passenger seat air bag, in which FIG. 15A is a plan view, and FIG. 15B is a side view.

FIGS. 16A and 16B are views for explaining the inflation condition of the passenger seat air bag, in which FIG. 16A is a plan view, and FIG. 16B is a side view.

DETAILED DESCRIPTION

A first embodiment will be described below with reference to FIGS. 1 to 17.

Figure 1:
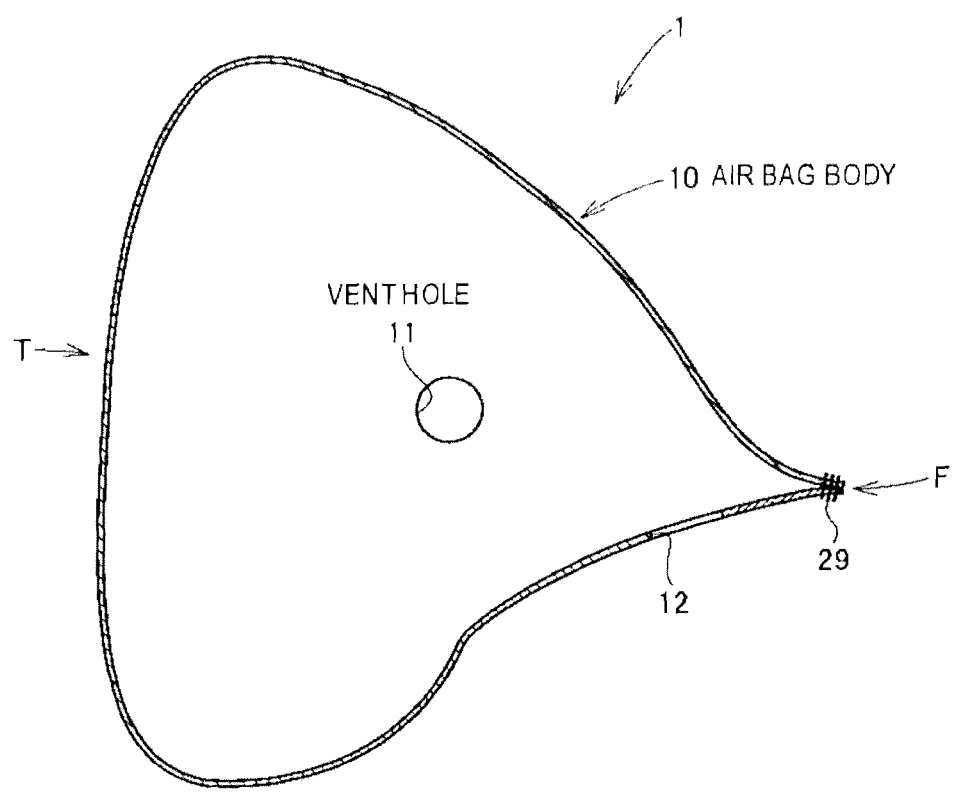
FIG. 1 is a longitudinally sectional view of a passenger seat air bag according to a first embodiment in the front/back direction of a vehicle.

As shown in FIG. 1, vent holes 11 are provided in left and right opposite side faces of an air bag body 10 of a passenger seat air bag 1. An inflator opening 12 is provided on a base end side of the air bag body 10, that is, in a bottom face on a front end side of a vehicle. T expresses a face opposed to a passenger.

Each vent hole 11 is provided in a portion as close to the inflator opening 12 as possible in a region where the vent hole 11 does not touch either an A-pillar garnish or an instrument panel when the inflated air bag body 10 restrains a passenger. It is preferable that the opening area of the vent hole 11 is about 12 to 51 cm2, especially about 19 to 40 cm2.

Figure 2A:
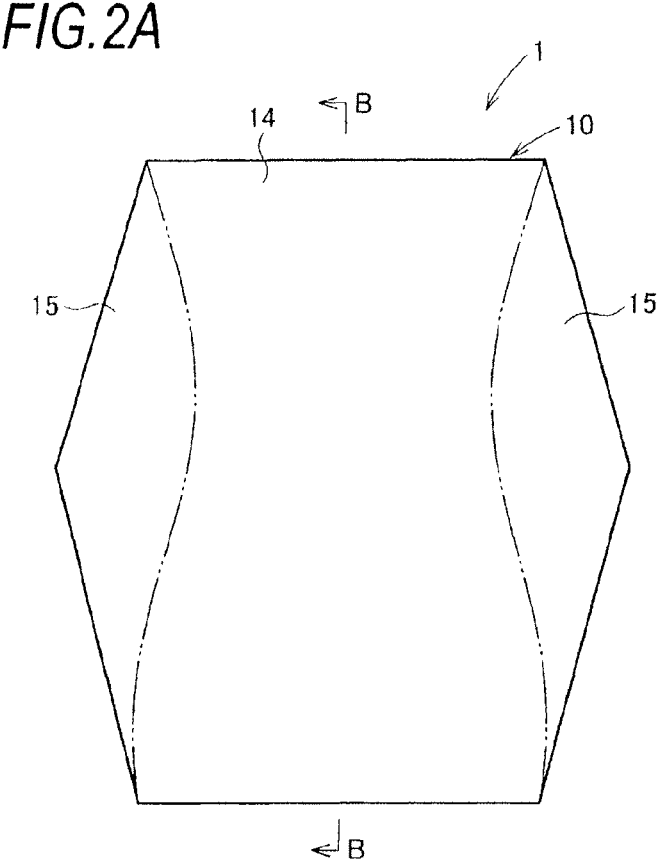

In the air bag body 10, a center panel 14 serving as a main panel and left and right side panels 15 and 15 are sewn up as shown in FIG. 2A. The center panel 14 forms an upper face, the face T opposed to the passenger, and a lower face in the air bag body 10 which is inflated. The left and right side panels 15 and 15 form left and right side faces of the air bag body 10. The vent holes 11 are provided in the side panels 15 respectively. The passenger seat air bag 1 is manufactured as follows. After the center panel 14 and the side panels 15 are sewed up, the air bag body 10 is reversed through an opening portion F (see FIG. 1) of the air bag body 10 which has not yet been sewed up and which is located on the front end side of the vehicle. After that, the opening portion F is sewed up by stitches 29.

A retainer ring 40 is disposed in the air bag body 10 so as to lie on the circumferential edge of the inflator opening 12. Stud bolts 41 and 43 are provided erectly on the retainer ring 40.

In the air bag body 10, small holes (not shown) to which bolts can be inserted are provided in the circumferential edge portion of the inflator opening 12. The stud bolts 41 are inserted into the small holes respectively. In addition, small holes to which the stud bolts 43 can be inserted are provided in the air bag body 10. The stud bolts 43 may be pins.

The procedure of folding the air bag body 10 will be described with reference to FIGS. 2 to 14.

Figure 2B:
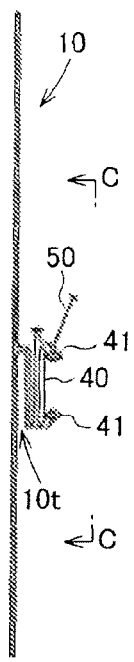
Figure 2C:
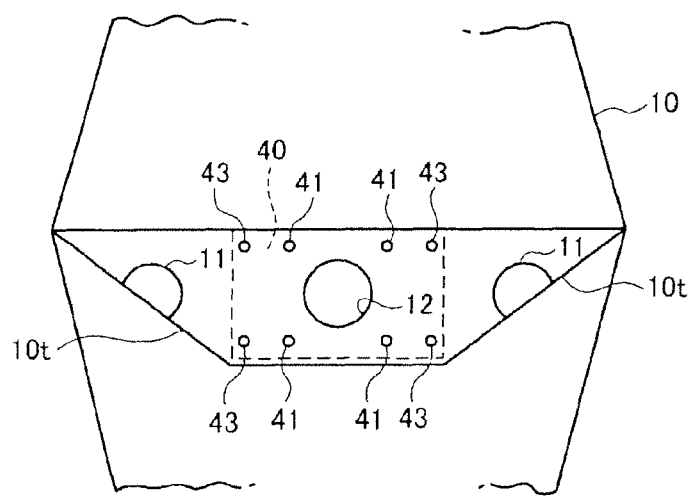

One end of a protector cloth 50 is hung on the stud bolts 41 and 43 on the side of one half of the retainer ring 40 in advance. First, as shown in FIGS. 2A to 2C, the air bag body 10 is spread on a flat work table (not shown) so that the face T opposed to the passenger can look upward. Then, as shown in FIGS. 2B and 2C, the air bag body 10 is partially folded to form a tucked portion 10t so that the vent holes 11 can be located on the left and right sides of the retainer ring 40.

Figure 3A:
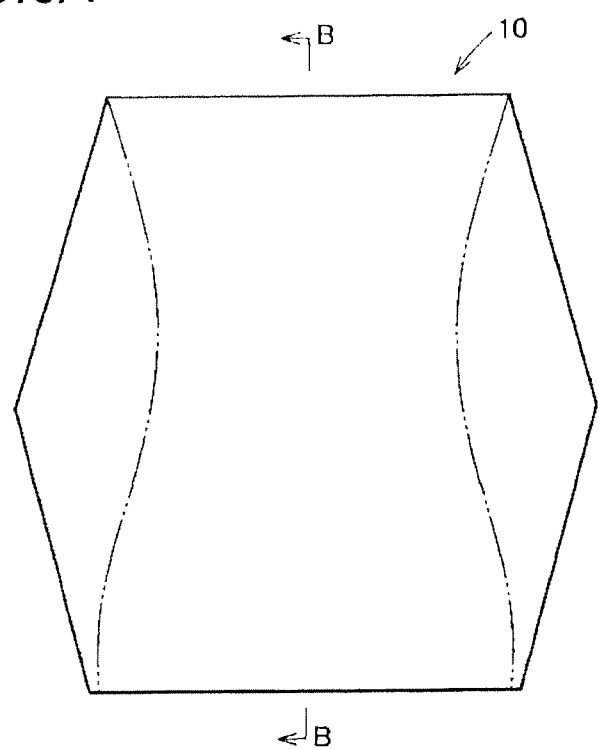
Figure 3B:
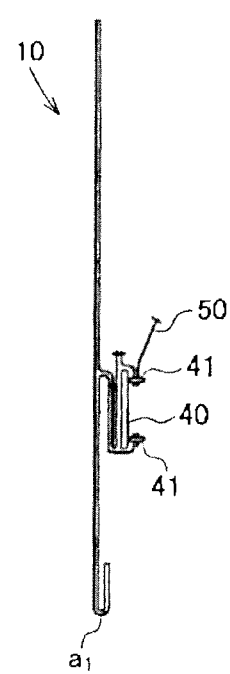
Figure 4A:
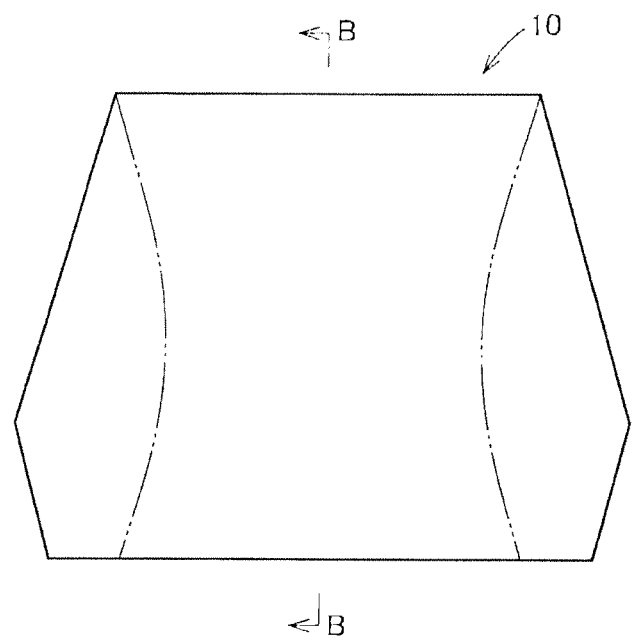
Figure 4B:
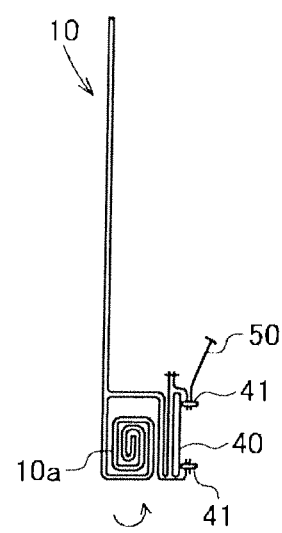

Next, as shown in FIGS. 3A and 3B, the bottom side of the air bag body 10 is folded along a fold line a1 in the left-right direction and on an opposite side to the face opposed to the passenger. This is repeated sequentially for rolling a plurality of times as shown in FIGS. 4A and 4B, so as to form a bottom side folded piece 10a. The bottom side folded piece 10 is put on a bag center region (center region in the up-down direction) on an upper side of the retainer ring 40.

Figure 6A:
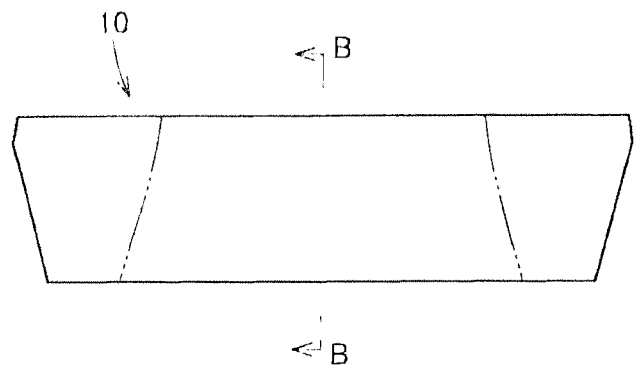
Figure 6B:
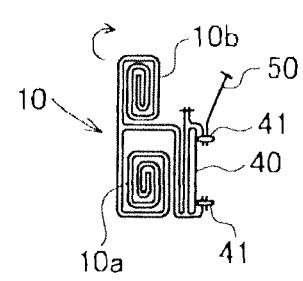

Next, as shown in FIGS. 5A and 5B, the top side of the air bag body 10 is folded along a fold line b1 in the left-right direction and on the opposite side to the face opposed to the passenger. This is repeated sequentially as shown in FIGS. 6A and 6B, so as to form a top side folded piece 10b.

Figure 7A:
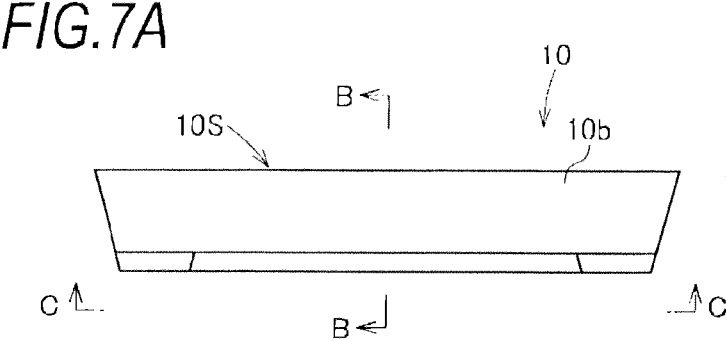
Figure 7B:
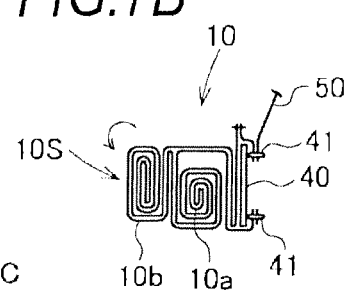
Figure 7C:
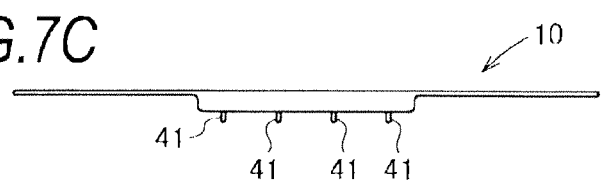
Figure 8A:
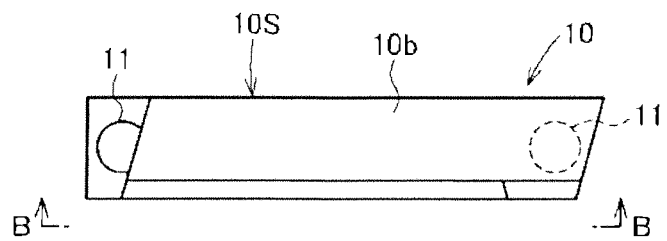
Figure 8B:
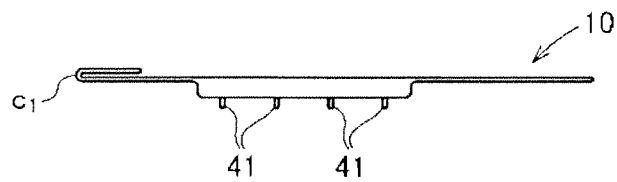

As shown in FIGS. 7A to 7C, the top side folded piece 10b is put on the bottom side folded piece 10a (on an opposite side to the retainer ring 40). Thus, as shown in FIG. 7A, a laminated piece 10S which is long and narrow in the left-right direction and in which the bottom side folded piece 10a and the top side folded piece 10b are put on top of each other is formed.

Figure 9A:
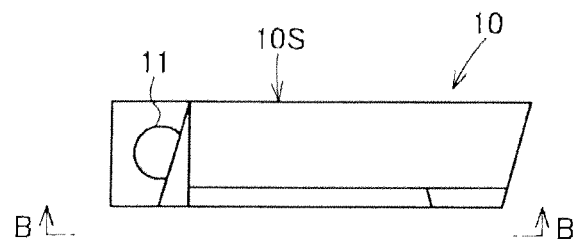
Figure 9B:
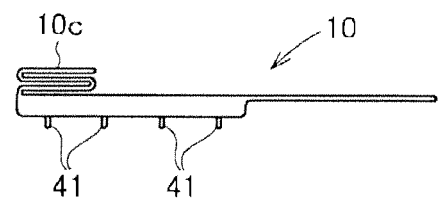
Figure 10A:
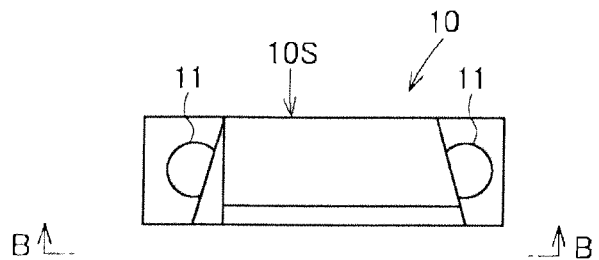
Figure 10B:
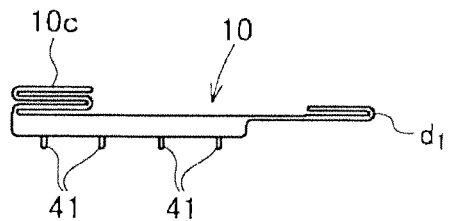

Next, as shown in FIGS. 8A, 8B, 9A and 9B, the left half of the laminated piece 10S is folded upward into concertinas along a fold line c1 in the up-down direction (direction connecting the top side and the bottom side), so as to form a left side folded piece 10c. The left side folded piece 10c is put on a center portion (center portion in the left-right direction) of the laminated piece 10S on the retainer ring 40. As shown in FIG. 9A, the left vent hole 11 is located in an upper face of the left side folded piece 10c.

Figure 11A:
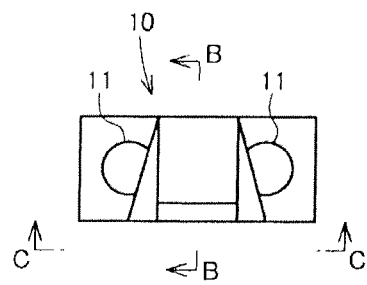
Figure 11B:
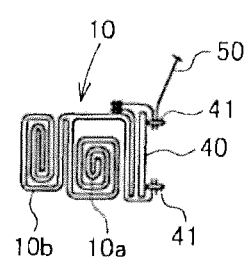

Next, as shown in FIGS. 10A, 10B, 11A, 11B and 11C, the right half of the laminated piece is folded upward into concertinas along a fold line d1 in the up-down direction, so as to form a right side folded piece 10d. The right side folded piece 10d is put on the center portion (center portion in the left-right direction) of the laminated piece 10S on the retainer ring 40. As shown in FIG. 11A, the right vent hole 11 is located in an upper side of the right side folded piece 10d.

Figure 11C:
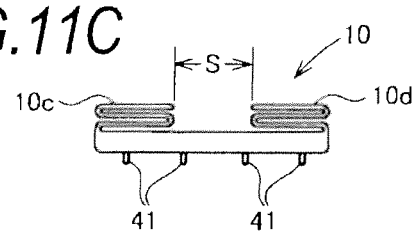
Figure 12A:
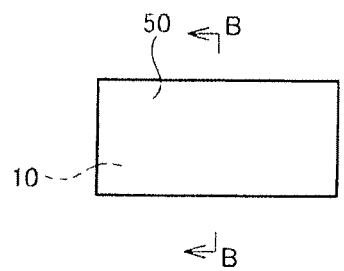
Figure 12B:
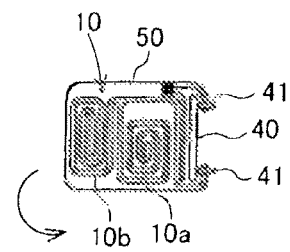

The left side folded piece 10c and the right side folded piece 10d are disposed with a space S therebetween, as shown in FIG. 11C. It is preferable that the space S is about 100 mm or more, for example, about 100 to 250 mm, especially about 110 to 180 mm.

Figure 13:
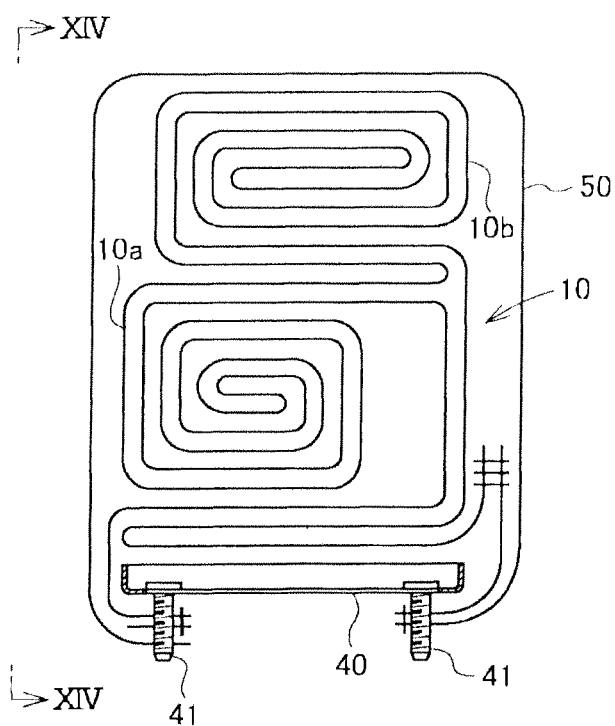
FIG. 13 is a longitudinally sectional view of folded pieces in the passenger seat air bag.
Figure 14:
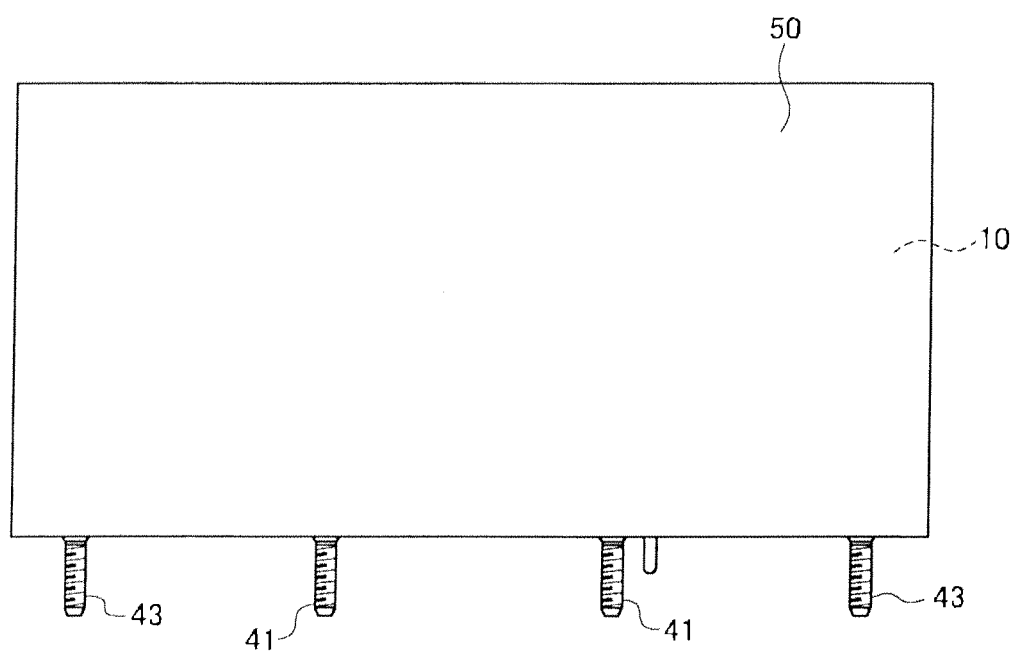
FIG. 14 is an arrow view taken on line XIV-XIV in FIG. 13.
Figure 15A:
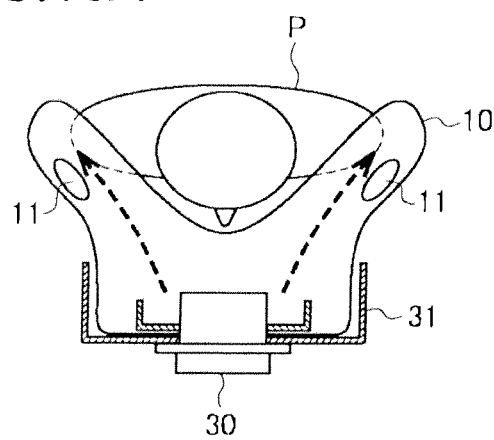
Figure 15B:
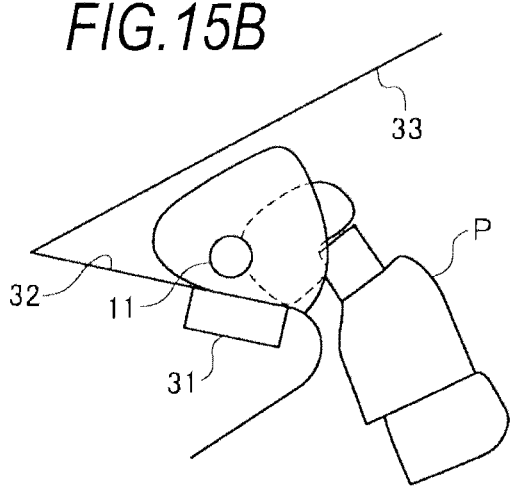

Next, the air bag folded pieces are covered with the protector cloth 50. The protector cloth 50 is hung on the stud bolts 41 and 43 as shown in FIGS. 13 and 14. The protector cloth 50 is a rectangular cloth, which is provided with a slit (not shown) at which splitting will start. The slit extends in the left-right direction in FIG. 14.

FIGS. 13 and 14 are a sectional view and a side view of the air bag which has been folded up and covered with the protector cloth 50. An inflator 30 (FIGS. 15A and 15B) is attached to a retainer 31 by use of the stud bolts 41. A front end side of the inflator 30 is plugged into the air bag body 10 through the inflator opening 12. The passenger seat air bag 1, the inflator 30 and the retainer 31 are coupled by the stud bolts 41, and a lid is attached thereto. Thus, a passenger seat air bag apparatus is formed. The lid may be a lid portion of an instrument panel 32.

The passenger seat air bag apparatus is assembled in an upward face of the instrument panel 32 as shown in FIGS. 15A to 17. The reference numeral 33 in FIGS. 15A to 17 represents a wind shield.

When the activation of the inflator 30 is started due to the collision of the vehicle or the like, the gas from the inflator 30 flows into the air bag body 10, and the air bag body 10 begins to expand. In this embodiment, the left side folded piece 10c and the right side folded piece 10d are folded into concertinas and located in the uppermost portion of the air bag folded pieces. Accordingly, when the gas flows in from the inflator 30, the left side folded piece 10c and the right side folded piece 10d are inflated quickly to thrust laterally in the left-right direction, as shown in FIGS. 15A, 15B, 16A and 16B. In addition, the vent holes 11 are located to be exposed in the upper faces (the outward faces) of the left side folded piece 10c and the right side folded piece 10d. Accordingly, as soon as the left side folded piece 10c and the right side folded piece 10d begin to expand, the gas from the interiors of the left side folded piece 10c and the right side folded piece 10d can flow out through the vent holes 11. Thus, when there is an interfering body (human body P in this case) close to the instrument panel 32, the gas flows out quickly through the vent holes 11 so as to relax the input power applied to the interfering body, as shown in FIGS. 15A, 15B, 16A and 16B.

The space S is secured between the left side folded piece 10c and the right side folded piece 10d. Accordingly, when the interfering body is located between the left side folded piece 10c and the right side folded piece 10d, a space is also secured between the left side folded piece 10c and the right side folded piece which have begun to expand. Thus, as shown in FIGS. 15A, 15B, 16A and 16B, the left-right-direction center portion of the air bag body 10 becomes lower (on the instrument panel 32 side) than the left end side and the right end side, and serves as concavity. Thus, the input power to the interfering body is relaxed.

Figure 16A:
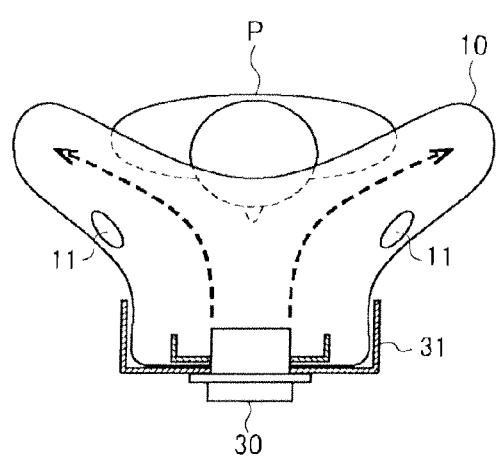
Figure 16B:
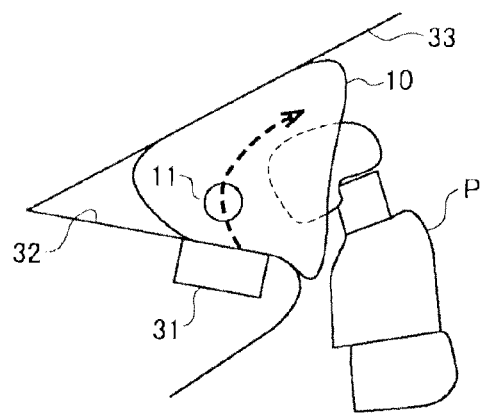
Figure 17:
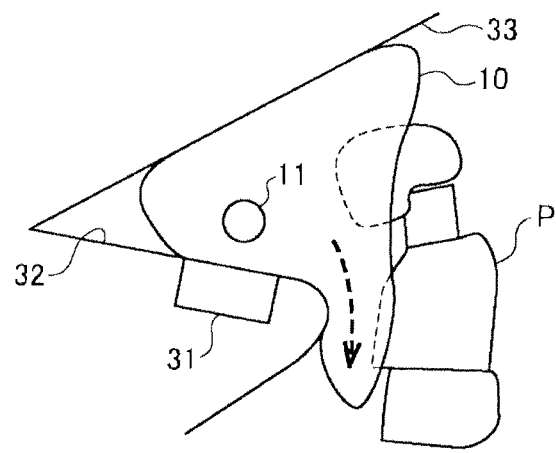
FIG. 17 is a side view for explaining the inflation condition of the passenger seat air bag.

When the space S between the left side folded piece 10c and the right side folded piece 10d is made not shorter than 100 mm, the input power to the interfering body is relaxed. In this embodiment, the bottom side folded piece 10a is formed first, and the top side folded piece 10b is then formed and put on the upper side of the bottom side folded piece 10a. Accordingly, when the air bag body 10 begins to expand, the left side folded piece 10c and the right side folded piece 10 begins to expand first as described above, and then the top side folded piece 10b begins to expand. As shown in FIGS. 16A and 16B, the upper body of the approaching passenger P pushed by the top side folded piece 10b retreats to make a space between the breast of the passenger P and the instrument panel 32. The bottom side folded piece 10a which is inflated last enters the space while expanding. Thus, the air bag body 10 stands widely between the instrument panel 32 and the passenger P.

In this embodiment, each vent hole 11 is provided in a portion closest to the base end side (the instrument panel 32 side in this embodiment) in the region where the vent hole 11 does not lie on either the instrument panel 32 or the A-pillar garnish when a passenger is restrained. Accordingly, the gas flows out from the interior of the air bag body 10 through the vent hole 11 so that an impact on the passenger can be absorbed.

A second embodiment will be described with reference to FIGS. 18 to 22. In this embodiment, a diffuser 20 is placed in the air bag body 10 in the first embodiment.

Figure 20:
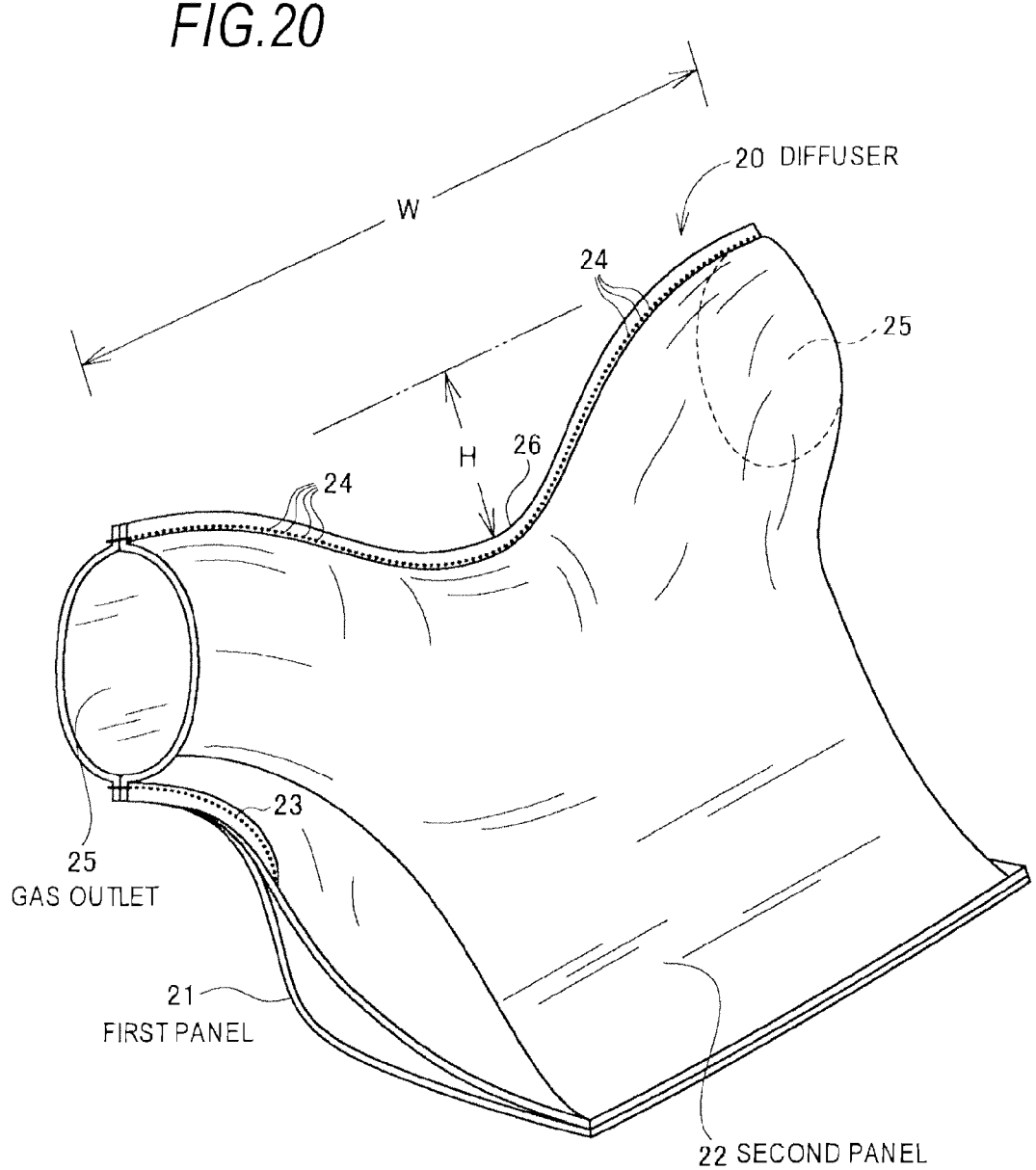
FIG. 20 is a perspective view of a diffuser.
Figure 21:
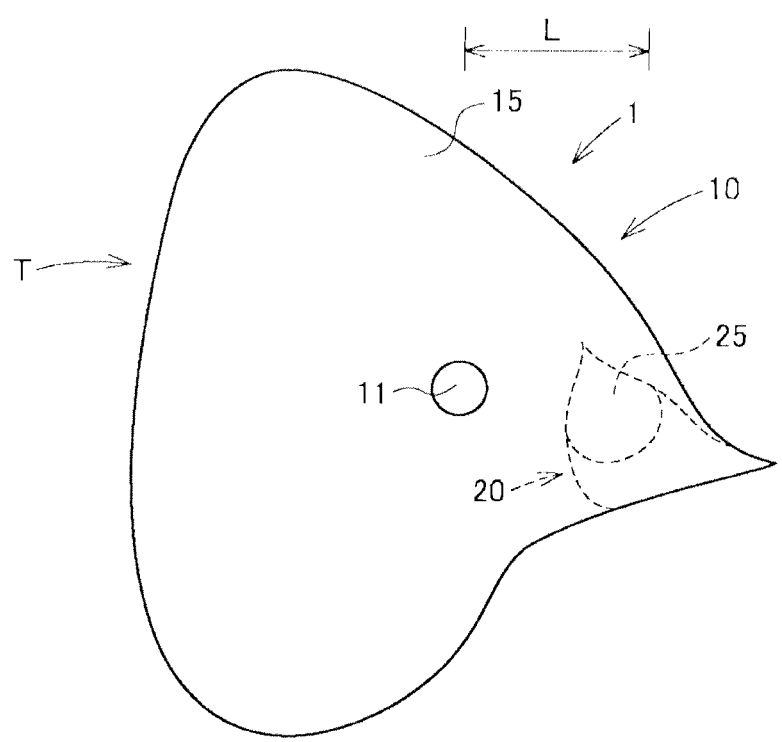
FIG. 21 is a side view of the passenger seat air bag in FIG. 18.
Figure 22:
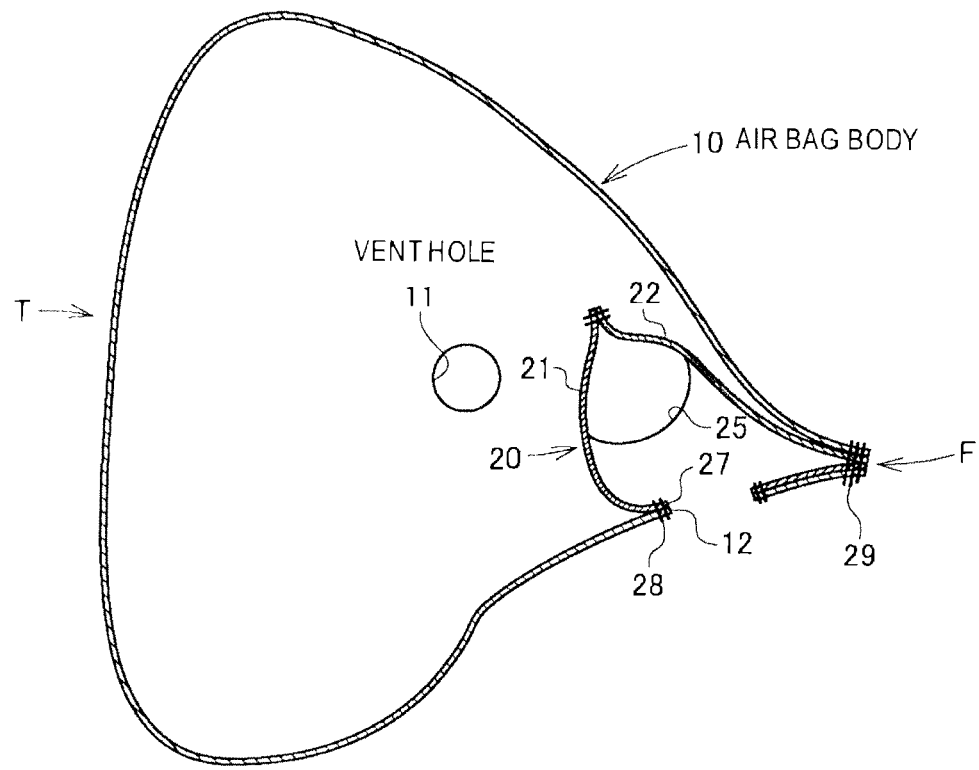
FIG. 22 is a longitudinally sectional view of the passenger seat air bag in FIG. 18.

In the diffuser 20, a first panel 21 on the rear side of the vehicle and a second panel on the front side of the vehicle are sewn up by stitches 23 and 24, as shown in FIGS. 20 and 22. Side portions of the panels 21 and 22 are sewn up by the stitches 23, and upper edge portions of the panels 21 and 22 are sewn up by the stitches 24.

As shown in FIG. 20, each panel 21, 22 is formed into a substantially Y-shape whose upper portion thrusts slightly to the left and right. The stitches 23 sews up the side portions of the panels 21 and 22 with each other under those thrust portions in the upper portions of the panels 21 and 22. Thus, as shown in FIG. 20, gas outlets 25 and 25 are formed on the left and right in the upper portion of the diffuser 20.

As shown in FIG. 20, each panel 21, 22 is formed into a shape whose upper side portion has a concave center portion. A recess 26 which is concave toward the base end side, that is, downward, is formed at the center of the upper portion of the diffuser 20 which is completely inflated.

In the completely inflated condition, the opening area of each gas outlet 25 is preferably about 1.1 to 3.0 times, especially about 1.3 to 2.0 times as large as the opening area of each vent hole 11. The opening area of each vent hole 11 is preferably about 12 to 51 cm2, especially about 19 to 40 cm2.

Figure 18:
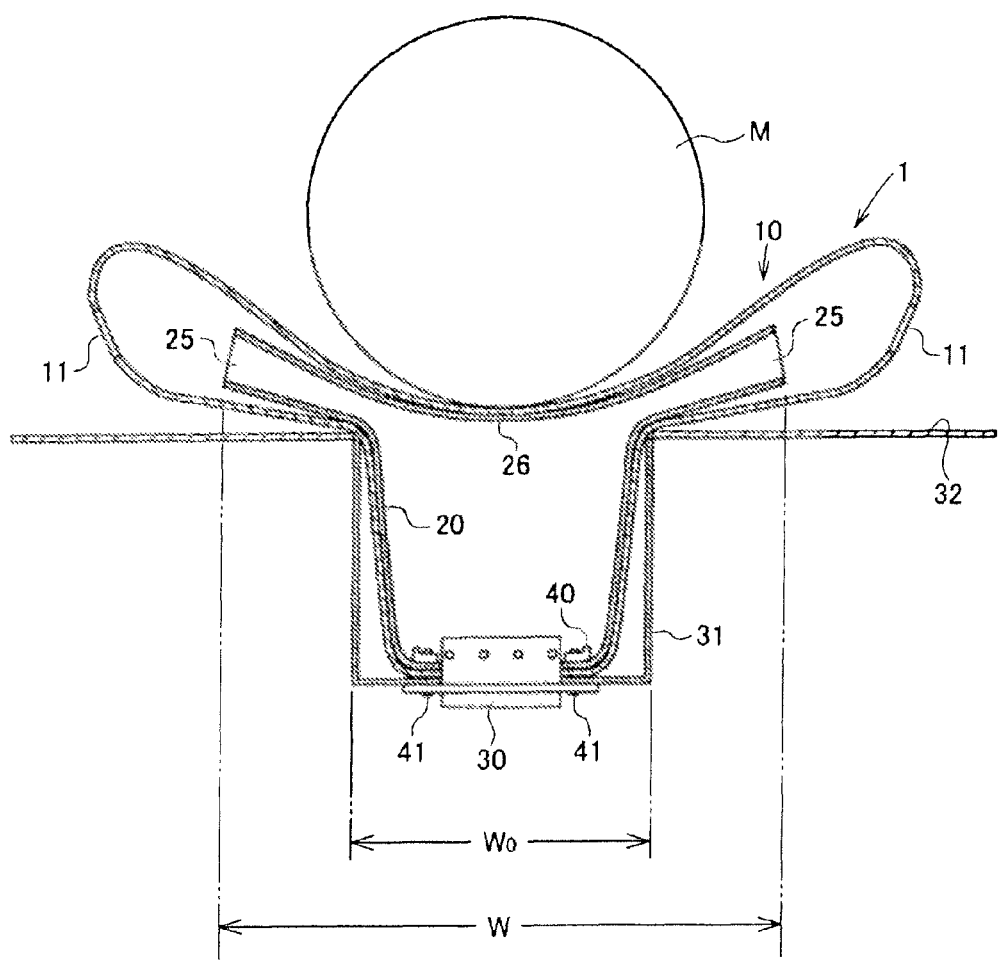
FIG. 18 is a sectional view showing a passenger seat air bag according to a second embodiment, which is in the middle of inflation.

In the completely inflated condition, a distance W between the left gas outlet 25 and the right gas outlet 25 is preferably about 230 to 440 mm, especially about 270 to 380 mm. As shown in FIG. 18, the distance W is at least 100 mm longer than a left-to-right opening width W0 of an air bag apparatus installation hole in the instrument panel 32.

In addition, in the completely inflated condition, a height difference H between the upper end connecting the left and right opposite ends of the diffuser 20 and the lowest portion of the recess 26 is preferably about 50 to 160 mm, especially about 70 to 130 mm.

An inflator opening 27 (FIG. 22) which can be put on top of the inflator opening 12 of the air bag body 10 is provided in the first panel 21 of the diffuser 20. The circumferential edge portions of the openings 12 and 27 are sewn up by stitches 28.

The passenger seat air bag 1 is manufactured as follows. After the center panel 14, the side panels 15 and the first and second panels 21 and 22 are sewed up, the air bag body 10 is reversed through an opening portion F (see FIG. 1) of the air bag body 10 which has not yet been sewed up and which is located on the front end side of the vehicle. After that, the opening portion F is sewed up by stitches 29. The first and second panels 21 and 22 are sewn up together with the center panel 14 by the stitches 29. Since the first and second panels 21 and 22 are sewn up together with the center panel 14 in this manner, the man-hours for sewing up the air bag 1 can be reduced, and the air bag 1 can be manufactured easily.

The air bag, the air bag apparatus and the vehicle mounted with the same in the second embodiment are configured in the same manner as in the first embodiment. Parts the same as those in the first embodiment are referred to by the same signs correspondingly.

The passenger seat air bag apparatus is also assembled in the upward face of the instrument panel 32. The air bag body 10 and the diffuser 20 are retained by the retainer 31 so that the circumferential edge portions of the inflator openings 12 and 27 can be put between the retainer ring (FIG. 18) 40 and the bottom face of the retainer 31.

When the vehicle mounted with the passenger seat air bag apparatus collides in front, the inflator 30 is activated to generate gas, and the gas flows into the air bag body 10 through the diffuser 20. When the diffuser 20 is inflated, the lid portion 33 (FIG. 19) of the instrument panel 32 begins to open, and the diffuser 20 and the air bag body 10 begin to be unfolded above the instrument panel 32. In the initial phase of the unfolded condition, the diffuser 20 is substantially completely inflated immediately, and the gas outlets 25 are located above the instrument panel 32. When an interfering body M is close to the passenger seat air bag apparatus in the instrument panel 32 during the inflation of the air bag, the inflated air bag body 10 pushes the interfering body M. However, due to the diffuser 20 disposed in the air bag body 10, the gas from the inflator 30 flows out to the left and right through the gas outlets 25 of the diffuser 20. Thus, the air bag body is mainly inflated in the left-right direction so that inflation toward the interfering body M can be suppressed. In addition, the recess 26 is provided in the diffuser 20. The recess 26 faces the interfering body M. For this reason, the pressing force (input power) applied to the interfering body M by the diffuser 20 and the air bag body 10 can be relaxed.

Figure 19:
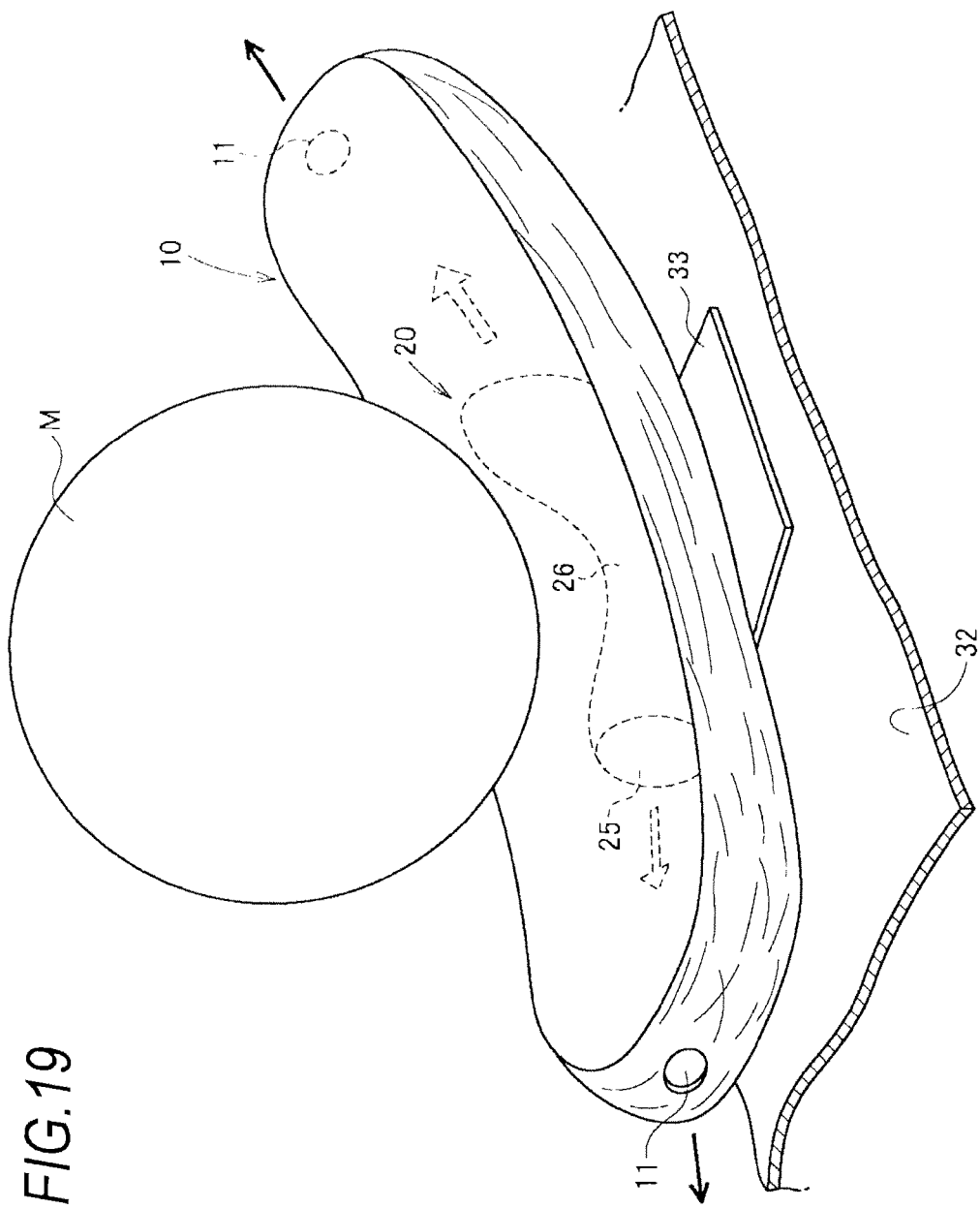
FIG. 19 is a perspective view showing the passenger seat air bag in FIG. 18, which is in the middle of inflation and which is viewed from the front side of a vehicle.

In addition, in this embodiment, as shown in FIGS. 18 and 19, the vent holes 11 are located on the extension lines of the gas flow-out directions through the gas outlets 25 of the diffuser 20 when the air bag body 10 is inflated in the left-right direction in the early stage of the inflation. Therefore, the gas flowing into the air bag body 10 from the diffuser 20 travels straight as it is, and flows out quickly from the air bag body 10 side through the vent holes 11. Thus, the inflation pressure in the air bag body 10 is low. Also in this manner, the input power applied to the interfering body M is small.

When the interfering body M is absent, the air bag body 10 expands immediately toward the rear of the vehicle in the state of FIGS. 18 and 19, and moves so that the vent holes 11 are located behind the gas outlets 25. Thus, the positions of the gas outlets 25 are displaced from the positions of the vent holes 11 so that the amount of the gas flowing out through the vent holes 11 becomes small. The air bag body 10 is inflated up to the completely inflated condition quickly. In the completely inflated condition shown in FIG. 22, each vent hole 11 is preferably located more rearward of the vehicle than each gas outlet 25 by 80 mm or longer in distance between the opening center of the vent hole 11 and the opening center of the gas outlet 25.

In the invention, a tether for regulating the left-to-right width or the front-to-back length of the inflated air bag body may be provided.

What is claimed is:

1. A passenger seat air bag comprising an air bag body that is folded up and that is provided with vent holes in opposite side faces thereof and an inflator opening on a base end side thereof, wherein:
    a bottom side which is to be a lower side when the air bag body is completely inflated is rolled so as to be formed as a bottom side folded piece;
    a top side which is to be an upper side when the air bag body is completely inflated is rolled so as to be formed as a top side folded piece, and the top side folded piece is put on a passenger side of the bottom side folded piece so as to be formed as a laminated piece of the bottom side folded piece and the top side folded piece;
    a left side and a right side of the laminated piece which are to be a left side and a right side of a passenger respectively are folded into concertinas so as to be formed as a left side folded piece and a right side folded piece;
    the left side folded piece and the right side folded piece are disposed on a left-right-direction center portion of the laminated piece so as to make a space between the left side folded piece and the right side folded piece; and
    the vent holes are located in outward faces of the left side folded piece and the right side folded piece respectively.

2. The passenger seat air bag according to claim 1, wherein: the vent holes are located on an opposite side with respect to the left-right-direction center portion of the laminated piece consisting of the left side folded piece and the right side folded piece such that the vent holes are to be exposed in the outward faces.

3. The passenger seat air bag according to claim 1, wherein: the space between the left side folded piece and the right side folded piece is 100 mm or more.

4. The passenger seat air bag according to claim 1, wherein: the vent holes are provided in a portion closest to the base end side in a region where the vent holes is not to be put on either an instrument panel or an A-pillar garnish when the passenger is restrained.

5. The passenger seat air bag according to claim 1, wherein: a diffuser having gas outlets for letting gas from an inflator flow into sides of the air bag body is disposed in the air bag body; and
    a left-right-direction center portion of the diffuser is located more on the base end side than the left end side and the right end side of the diffuser when the diffuser is inflated.

6. The passenger seat air bag according to claim 5, wherein: the vent holes are located in extension directions of gas flow-out directions through the gas outlets of the diffuser in an early stage of inflation of the passenger seat air bag, and
    the vent holes are located more rearward of a vehicle than the gas outlets when the passenger seat air bag is completely inflated.

7. The passenger seat air bag according to claim 5, wherein: a distance between the left and right gas outlets is 230 to 440 mm when the diffuser is completely inflated; and
    the center portion of the diffuser is located 50 to 160 mm closer to the base end side than the left send side and the right end side of the diffuser.

8. The passenger seat air bag according to claim 5, wherein: an opening area of each of the gas outlets is 1.1 to 3.0 times as large as an opening area of each of the vent holes when the diffuser is completely inflated.

9. A passenger seat air bag apparatus comprising:
    the passenger seat air bag according to claim 1; and
    an inflator that inflates the passenger seat air bag.

10. A vehicle comprising:
    the passenger seat air bag apparatus according to claim 9.

* * * * *